(12) United States Patent
Rastegar

(10) Patent No.: US 8,514,383 B2
(45) Date of Patent: Aug. 20, 2013

(54) SYSTEM AND METHOD FOR PROVIDING A POLARIZED RF REFERENCE SYSTEM WITH SCANNING POLARIZED RF REFERENCE SOURCES AND THEIR SELF-ALIGNMENT FOR MUNITIONS

(75) Inventor: Jahangir S. Rastegar, Stony Brook, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 404 days.

(21) Appl. No.: 12/885,463

(22) Filed: Sep. 18, 2010

(65) Prior Publication Data

US 2011/0176129 A1 Jul. 21, 2011

Related U.S. Application Data

(63) Continuation-in-part of application No. 11/888,797, filed on Aug. 2, 2007, now Pat. No. 8,164,745.

(60) Provisional application No. 60/835,022, filed on Aug. 2, 2006.

(51) Int. Cl.
*G01B 11/26* (2006.01)
*G01C 1/00* (2006.01)
*G01S 13/00* (2006.01)

(52) U.S. Cl.
USPC ............ 356/138; 342/147; 342/157; 342/158

(58) Field of Classification Search
USPC ..................... 356/138; 342/28, 62, 118, 126, 342/146, 147, 154, 157, 158, 450, 458, 463; 343/756, 757, 762, 772, 775
See application file for complete search history.

(56) References Cited

U.S. PATENT DOCUMENTS

| | | | | |
|---|---|---|---|---|
| 6,445,344 B1 * | 9/2002 | Wise et al. | ..................... | 342/458 |
| 6,724,341 B1 * | 4/2004 | Pereira et al. | ................... | 342/62 |
| 7,193,556 B1 * | 3/2007 | Pereira et al. | ................... | 342/62 |
| 8,164,745 B2 * | 4/2012 | Rastegar et al. | ............... | 356/138 |
| 8,259,292 B2 * | 9/2012 | Rastegar et al. | ............. | 356/138 |
| 2002/0098851 A1 * | 7/2002 | Walczak et al. | ............... | 455/456 |
| 2012/0313812 A1 * | 12/2012 | Rastegar | ....................... | 342/157 |

* cited by examiner

*Primary Examiner* — Michael A Lyons

(57) ABSTRACT

Arbitrarily deploying scanning polarized RF reference sources and using them to establish a full position and angular orientation reference coordinate system or a full angular orientation reference coordinate system that objects property equipped with polarized RF sensors could use to determine their angular position and/or orientation relative to the reference coordinate system.

12 Claims, 10 Drawing Sheets

SYSTEM AND METHOD FOR PROVIDING A POLARIZED RF REFERENCE SYSTEM WITH SCANNING POLARIZED RF REFERENCE SOURCES AND THEIR SELF-ALIGNMENT FOR MUNITIONS

CROSS-REFERENCE TO RELATED APPLICATIONS

The present application is a continuation-in-part is U.S. application Ser. No. 11/888,797 filed on Aug. 2, 2007 which claims priority to U.S. provisional patent application Ser. No. 60/835,022, filed on Aug. 2, 2006, the entire contents of each of which is incorporated herein by reference.

BACKGROUND OF THE INVENTION

1. Field of the Invention

The present invention relates generally to orientation and/or position referencing systems, more particularly, to systems and methods for providing orientation and/or position referencing systems with scanning polarized RF reference sources.

2. Prior Art

For guidance and/or steering purposes, all manned and unmanned mobile platforms, such as land vehicles, powered or non-powered airborne platforms, surface marine platforms, or various space vehicles, require onboard information as to their absolute position and/or orientation or their position and/or orientation relative to another object such as a reference platform or a target object. Here, by absolute position and/or orientation are meant to be relative to a reference coordinate system such as earth or one established by other means such as the present polarized RF reference sources.

This position and orientation information is particularly important for unmanned and guided platforms such as mobile robots, Unmanned Aerial Vehicles (UAV), Unmanned Ground Vehicles (UGV), and the like. This is also the case in future smart and guided projectiles, including gun-fired munitions, mortars, missiles and gravity dropped weapons. Such platforms will also require the aforementioned absolute and/or relative position and orientation information onboard the platform for closing the feedback guidance and control loop to guide the platform to the desired target or track a specified trajectory or the like.

In certain cases, the onboard position and certain orientation (usually not full orientation) information (absolute or relative to the target, a reference station, another mobile platform, etc.) can be provided by an outside source, for example, by GPS for position or by a radar reading or optical signal that is reflected off some target or received by the mobile platform. In other cases, it is either required or is highly desirable to have autonomous sensors onboard the mobile platform, including gun-fired projectiles, mortars and missiles, UAVs and UGVs, to directly measure the position and orientation of the object with respect to a fixed object (for example a ground station) or a moving object (for example a moving target).

It is noted that even though in this disclosure all references are made to moving platforms, it will be appreciated by those of ordinary skill in the art that the provided description also includes the measurement of the position and orientation of one object relative to another object, one or both of which may be fixed to a third object such as the ground.

Currently available sensors for remote measurement of the angular orientation of an object relative to the earth or another object (target or weapon platform) can be divided into the following five major classes.

The first class of sensors measure changes in the angular orientation using inertial devices such as accelerometers and gyros of various types. Inertial based angular orientation sensors, however, generally suffer from noise and drift error accumulation and settling time problems, particularly for gun-fired munitions and mortars. In such sensors, the drift and the measurement errors are accumulated over time since the measured acceleration has to be integrated to determine the position and angular orientation information. As a result, the error in the position and angular orientation measurements increases over time. In addition, the initial position (angular orientation) and velocity (angular velocity) of the object must be known accurately. Another shortcoming of inertia based position and angular orientation sensors is that the position and angular orientation of one object relative to another object cannot be measured directly, i.e., the position and angular orientation of each object relative to the inertia frame (earth in most cases) have to be measured separately and used to determine their relative position and angular orientation. As a result, errors in both measurements are included in the relative position and angular orientation measurements, thereby increasing it even further. In addition, electrical energy has to be spent during the entire time to continuously make such sensory measurements.

In the particular case of gun-fired munitions and mortars, two other major problems are encountered with inertia-based sensors. Firstly, they have to be made to withstand firing accelerations that in certain cases could be in excess of 100,000 Gs. However, to achieve the required guidance and control accuracy over relatively long distances and related times, the absolute angular orientation of the projectile has to be known during the entire time of the flight within very small angles corresponding to sub-fractions of one G. As a result, the accelerometers and gyros are prone to a settling time problem, particularly with the aforementioned initial high G loading. In certain cases, when GPS signal is available, it can be used to initialize the position information in accelerometers. The GPS, however, cannot be used to initialize gyros (except for orientation in the horizontal plane). Obviously, the development of inertia based accelerometers and gyros that could withstand the aforementioned high G levels and require near zero settling time is an extremely difficult task.

The second class of angular orientation sensors operates using optical methods. Such sensory systems can directly measure angular position of one object relative to another. As such, the optical sources used for such measurements can be used to set up a reference coordinate system relative to which the corresponding sensors on an object can measure the object position and/or orientation. However, optical based angular position sensory systems suffer from several disadvantages, including operation only in the line of sight between the two objects; accurate measurement of relative angular orientation only if the objects are relatively close to each other; limited range of angular orientation measurement; relatively high power requirement for operation; requirement of relatively clean environment to operate; and in military applications the possibility of exposing the site to the enemy and jamming. Optical gyros do not have most of the above shortcomings but are relatively large, require a considerable amount of power, expensive, and are difficult to harden for high G firing accelerations. Optical methods such as tracking of projectiles with surface mounted reflectors and the like have also been developed, which are extremely cumbersome to use even during verification testing, suffer from all the aforementioned shortcomings, and are impractical for fielded munitions. In addition, the information about the object orientation can usually be determined only at the ground station and has to be transmitted to the moving object for guidance and control purposes. As a result, optical angular position sensors are generally not suitable for munitions and other similar applications.

The third class of angular orientation sensors is magnetometers that can be used to measure orientation relative to the magnetic field of the earth. The main problem with magnetometers is that they cannot measure orientation of the object about the magnetic field of the earth. Other important issues are low sensitivity; requirement of an accurate map of the magnetic field in the area of operation; and sensitivity to the presence of vehicles and the like in the area, the configuration of which usually varies in time, particularly in an active war theatre.

The fourth class of angular orientation measurement systems are based on the use of radio frequency (RF) antennas printed or placed on the surface of an object to reflect RF energy emanating from a ground-based radar system. The reference coordinate system in which the position and/or orientation of the object is measured is thereby set up by the said (generally ground-based) radar system. The reflected energy is then used to track the object on the way to its destination. With two moving objects, the radar measures the time difference between the return signals from each of the objects and thereby determines angular information in terms of the angle that the relative velocity vector makes with respect to a coordinate system fixed to one of the objects. With such systems, measurement of full spatial orientation of an object (relative to the fixed radar or a second object) is very difficult. In addition, the information about the object orientation is determined at the radar station and has to be transmitted back to the moving object(s) if it is to be used for course correction. It is also very difficult and costly to develop systems that could track multiple projectiles. It is noted that numerous variations of the above method and devices have been devised with all suffering from similar shortcomings.

In addition to the above angular orientation measurement sensors, GPS signals can generally be only used to measure the direction of motion of the object in the horizontal plane. The reference coordinate system is thereby fixed to the earth. The GPS, however, has a number of significant shortcomings, particularly for munitions applications in general and gun fired munitions and mortars in particular. These include the fact that GPS signals may not be available along the full path of the flight; and the measurements cannot be made fast enough to make them suitable for guidance and control purposes in gun fired munitions and mortars. In addition, GPS signals are generally weak and prone to jamming.

The fifth class of angular orientation sensors is based on utilizing polarized Radio Frequency (RF) reference sources and mechanical cavities as described in U.S. Pat. Nos. 6,724,341 and 7,193,556 and U.S. Pat. No. 7,425,918, all of which are incorporated herein by reference, and hereinafter are referred to as "polarized RF angular orientation sensors". These angular orientation sensors use highly directional mechanical cavities that are very sensitive to the orientation of the sensor relative to the reference source due to the cross-polarization and due to the geometry of the cavity. The reference source may be fixed on the ground or may be another mobile platform (object). Being based on RF carrier signals, the sensors provide a longer range of operation. The sensors can also work in and out of line of sight. In addition, the sensors make angular orientation measurements directly and would therefore not accumulate measurement error. The sensor cavities receive and record the electromagnetic energy emitted by one or more polarized RF sources. The angular position of a cavity sensor relative to the reference source is indicated by the energy level that it receives. A system equipped with multiple such cavity sensors can then be used to form a full spatial orientation sensor. In addition, by providing more than one reference source, full spatial position of munitions can also be measured onboard the munitions.

The aforementioned polarized RF based angular orientation sensors provide highly precise angular orientation measurements. The sensors, when embedded in a mobile platform such as in a projectile, can measure full angular orientation of the projectile (mobile platform) relative to the reference coordinate system established by the polarized RF reference sources, which may be fixed to a ground station or to another moving object such as a UAV or UGV or another projectile (mobile platform) or the like. These angular orientation sensors are autonomous, i.e., they do not acquire sensory information through communication with a ground, airborne or the like sources. The sensors are relatively small and can be readily embedded into the structure of most mobile platforms including munitions without affecting their structural integrity. As a result, such sensors are inherently shock, vibration and high G acceleration hardened. A considerable volume is thereby saved for use for other gear and added payload. In addition, the sensors become capable of withstanding environmental conditions such as moisture, water, heat and the like, even the harsh environment experienced by munitions during firing. In addition, the sensors require a minimal amount of onboard power to operate, particularly since they only need to be powered when the sensory information is required.

The latter two classes of RF based full angular orientation and full position sensors promise to provide low cost, small volume and lightweight, low power, precision and autonomous onboard sensors for guidance and control of all mobile platforms, including future smart and precision guided munitions, as alternatives to inertia-based, optical, GPS and other similar currently available sensors.

The latter two classes of RF based full angular orientation sensors are dependent on the magnitude of the received signal at the sensors from the reference sources to determine the orientation of the sensor relative to the polarized RF reference source, i.e., relative to the reference coordinate system established by the polarized RF reference sources. This is the case, for example, for the aforementioned angular orientation sensors which are based on utilizing polarized Radio Frequency (RF) reference sources and mechanical cavities as described in U.S. Pat. Nos. 6,724,341 and 7,193,556 and U.S. Pat. No. 7,425,918.

Briefly, referring now to FIGS. 1 and 2, there is shown a representation of a polarized RF cavity sensor 100 and its operation with respect to a polarized radio frequency (RF) reference (illuminating) source 101. An electromagnetic wave consists of orthogonal electric (E) and magnetic (H) fields. The electric field E and the magnetic field H of the illuminating beam are mutually orthogonal to the direction of propagation of the illumination beam. When polarized, the planes of E and H fields are fixed and stay unchanged in the direction of propagation. Thus, the illuminating source establishes a (reference) coordinate system with known and fixed orientation. The polarized RF cavity sensor 100 reacts in a predictable manner to a polarized illumination beam. When three or more polarized RF cavity sources are distributed over the body of an object, and when the object is positioned at a known distance from the illuminating source, the amplitudes of the signals received by the polarized RF cavity sensors 100 can be used to determine the orientation of the object relative to the reference (illuminating) source 101, i.e., in the aforementioned reference coordinate system of the reference source 101. The requirement for the proper distribution of the polarized RF cavity sensors 100 over the body of the object is that at least three of the polarized RF cavity sensors be neither parallel nor co-planar.

It is therefore observed that the aforementioned classes of polarized RF based full angular orientation sensors are dependent on the magnitude of the received signal at the sensors from the polarized RF reference sources to determine the orientation of the sensors relative to the reference sources, i.e., relative to the reference coordinate system established by the polarized RF reference sources. The use of the signal magnitude, however, has several major shortcomings that limits the utility of such sensors as well as degrades their angular orientation measurement precision. The following are the major shortcomings of the aforementioned use of signal magnitude information in these sensors for measuring angular orientation relative to the polarized RF reference sources, i.e., relative to the reference coordinate system established by the polarized RF reference sources:

1. To relate the magnitude of the received signal to angular orientation, the distance from the reference source to the angular orientation sensors must be known. This in general means that other means have to be also provided to measure or indicate the position of the orientation sensor relative to the reference source. The position information may, for example, be provided by GPS or as mentioned in the aforementioned U.S. Pat. Nos. 6,724,341 and 7,193,556 by using three reference sources and triangulation techniques.
2. In practice, the signal received at the angular orientation sensor would be very noisy and face losses due to the environmental conditions and reflections, and is also prone to measurement errors at the sensors.
3. The magnitude of the signal received at the sensors and its relationship to the angular orientation of the sensors (object to which the sensors are attached) could be significantly different when the object is not in the line-of-sight of the reference source. Therefore when the object is not in the line-of-sight, the use of the received signal magnitude information could in general lead to significant degradation of the accuracy of the angular orientation measurements.

SUMMARY OF THE INVENTION

The use of polarized RF reference sources with scanning capability to establish a reference coordinate system would significantly reduce or eliminate the aforementioned shortcomings of the RF based full angular orientation sensors. This would be the case since scanning provides the means to use various well established techniques such as peak detection; a novel nonlinear signal processing method based on a curve matching and scaling which is disclosed later in this disclosure, and thereby significantly increase the angular orientation measurement precision, in certain cases by several orders of magnitude; and filtering out the noise and effects of reflections and multi-paths; making it possible to use these angular orientation sensors in both line-of-sight and non-line-of-sight settings. The use of polarized RF reference sources with scanning capability to establish a reference coordinate system would also eliminate the need to know the distance between the reference source and the angular orientation sensors. It is also shown later in this disclosure that the use of polarized RF reference sources with scanning capability would have additional advantages. For example, the precision with which the angular orientation is measured by the sensors is not dependent on the accurate calibration of the received signal magnitude information (usually surfaces). In addition, particularly for line-of-sight applications, if such calibration has been made, then as discussed below, the information can be used to calculate the distance between the reference sources to the sensors (object), i.e., the position of the object in the reference coordinate system established by the RF polarized reference sources. In addition, when more than one polarized RF reference sources is used to measure the position of the sensors (object) in the said reference coordinate system established by the RF polarized reference sources, the use of polarized RF reference sources with scanning capability would significantly increase the accuracy of these measurements.

It is noted that the disclosed methods and systems can allow the scanning capability of the present polarized RF source to be achieved without the use of any mechanical components and by the use of simple electronic circuitry using modulated signals of various patterns. As a result, the scanner can achieve almost any rate, any scanning pattern, scanning frequencies ranging from zero to several Hz, or KHz, or MHz depending on the application at hand.

A need therefore exists for methods and apparatus for establishing reference coordinate systems using the aforementioned polarized RF reference sources with scanning capability. Once such a reference coordinate system is established by the said scanning polarized RF reference sources, it would allow the aforementioned polarized RF angular sensors to measure the angular orientation and/or position of the object to which they are affixed in the established reference coordinate system. The scanning property of the scanning polarized RF reference sources allows the aforementioned angular orientations to be measured in both line-of-sight as well as in non-line-of-sight conditions. The peak detection feature of the disclosed angular orientation measurement system which is made possible by the disclosed scanning characteristic of the disclosed polarized RF reference sources would also make the angular orientation measurement significantly more accurate and tolerant to noise and other environmental effects. In addition, when calibrated for magnitude of the received signal, it would allow the measurement of the magnitude of the received signal at the RF polarized sensors to be used to measure the position of the said object in the established reference coordinate system in addition to its angular orientation measurement.

A need also exists for methods to "calibrate" the reference coordinate systems established with the aforementioned polarized RF reference sources with scanning capability, i.e., to determine an origin and the directions of the axes that define the said reference coordinate system, e.g., defining a Cartesian coordinate system.

It is noted that in certain applications, the position and orientation of each scanning polarized RF reference source relative to the other scanning polarized RF reference sources may be known. In certain other applications, the position but not orientation of at least one scanning polarized RF reference source relative to the other scanning polarized RF reference sources may be known. In yet other certain applications, neither the position nor the orientation of at least one of the scanning polarized RF reference source relative to the other scanning polarized RF reference sources may be known. The latter scenario will probably be encountered in situations such as in the battlefield where such scanning polarized RF reference sources are to be deployed very rapidly and probably remotely and "calibrated" and integrated as an element of the reference coordinate system. Thus the methods to "calibrate" the reference coordinate systems established with the aforementioned polarized RF reference sources must include methods that could perform the said polarized RF reference source calibration and integration as an element of the reference coordinate system for each one of the aforementioned scenarios.

An objective of the present invention is to provide a method and system for polarized RF reference sources with scanning capability, thereby allowing a significant increase in the angular orientation measurement precision of the aforementioned angular orientation sensors; filtering out the noise and effects of reflections and multi-paths; making it possible to use these angular orientation sensors in both line-of-sight and non-line-of-sight settings; and measure the distance between the reference source and the angular orientation sensors (object) in line-of-sight and non-line-of-sight situations. Such polarized RF reference sources with scanning capability can be designed to provide almost any desired scanning range and scanning frequency, ranging from Hz to KHz or even MHz frequencies, even non-sinusoidal patterns, to fit the application at hand.

Another objective of the present invention is to provide methods and apparatus for the establishment of reference coordinate systems using the aforementioned polarized RF reference sources with scanning capability. Such reference coordinate systems may be established only for the measurement of the angular orientation of an object in (relative to) the said reference coordinate system. Alternatively, the reference coordinate systems may be established only for the measurement of the position of an object in (relative to) the said reference coordinate system. Alternatively, the reference coordinate systems may be established for the measurement of both position and angular orientation of an object in (relative to) the said reference coordinate system.

Another objective of the present invention is to provide a novel nonlinear signal processing method based on a curve matching and scaling technique, thereby increasing the accuracy of the angular orientation (and distance between the reference source and the sensors, i.e., object, particularly in line-of-sight situations) measurement of the aforementioned angular orientation sensors. In certain applications, the use of non-sinusoidal scanning patterns has added advantages, some of which are described below.

Another objective of the present invention is to provide a method and system for establishing an angular orientation and/or position reference coordinate system for a large area, for example the field of operation of certain mobile platforms, such as the field of operation of mobile robotic platforms being used for rescue operations in certain fields.

Yet another objective of the present invention is to provide the method and system of establishing "homing" planes and/or lines and/or points using the aforementioned scanning polarized RF reference sources. Such "homing" "signals" can then be used by the mobile platform for guidance, e.g., for guiding it towards or away from a point or move towards or away from a line or a plane.

In addition, the disclosed polarized RF reference sources with scanning capability can be programmed to provide random scanning signals with very low power levels or on-off (pulsed) signals to avoid detection or utilize other detection avoidance procedures.

In addition, the disclosed method can readily allow the polarized RF reference sources to scan more than one range, for example for providing relatively narrow scanning ranges centered different angular distances apart with overlapping or non-overlapping scanning ranges.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Figure 1:
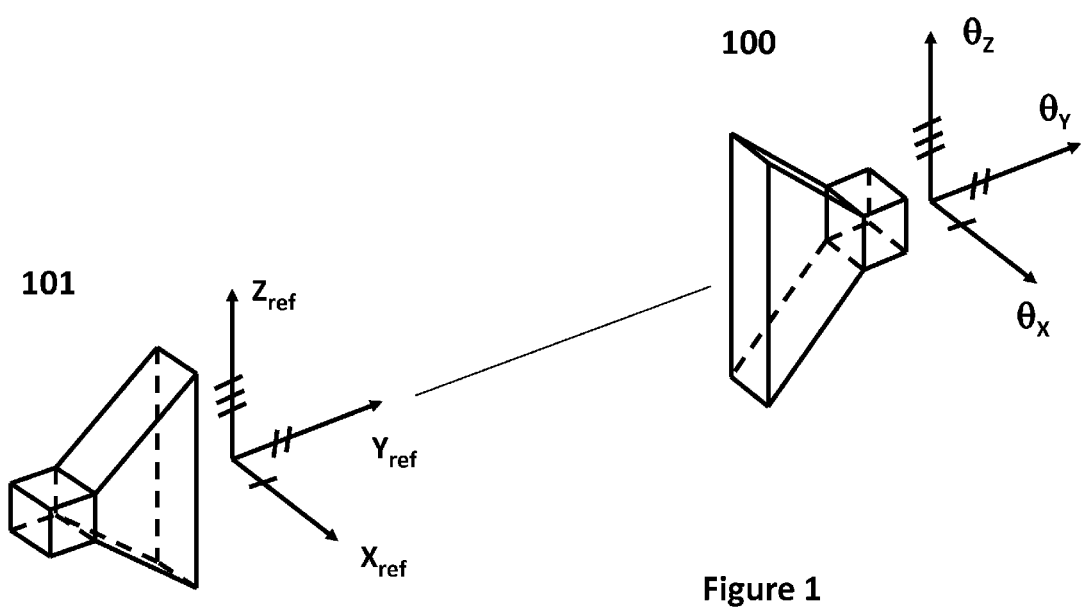
FIGS. 1 and 2 illustrate a schematic representation of a polarized radio frequency (RF) cavity sensor with respect to a polarized RF reference (illuminating) source of the prior art.
Figure 2:
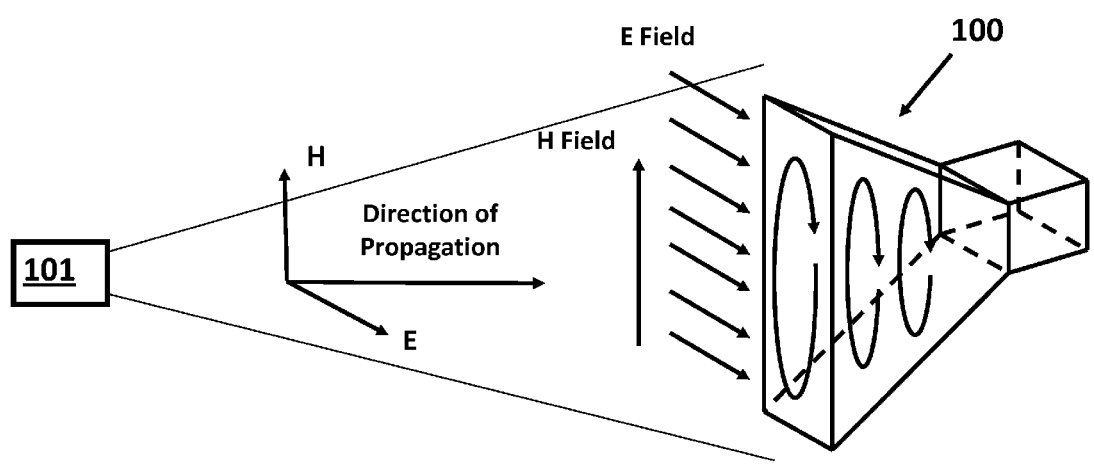

An electromagnetic wave is a propagation of electric and magnetic field disturbances in unison such that both electric and magnetic field vectors are perpendicular to the direction of propagation and to each other, they are in phase and in vacuum the ratio of their magnitude is constant. The wave is transverse (oscillations are perpendicular to the direction of propagation) and its velocity in free space is determined by the permittivity and permeability of free space. The polarization state of an electromagnetic wave is defined by the oscillation state of its transverse electric field in the plane perpendicular to propagation direction. Since the magnetic field is always perpendicular to the electric field and has a proportional magnitude it is redundant for the characterization of polarization. The magnitudes and phases of orthogonal components of electric field do not necessarily have the same values and the periodic curve traced out by the tip of the electric field vector describes the different states of polarization.

The electromagnetic waves in free space are described by the Maxwell equations without the charges and currents are $$\nabla \cdot E = 0$$

$$\nabla \cdot B = 0$$

$$\nabla \times E = -\frac{\partial B}{\partial t}$$

$$\nabla \times B = \varepsilon_0 \mu_0 \frac{\partial B}{\partial t}$$

where E and B are respectively the electric and magnetic (induction) fields, and $\epsilon_0$ and $\mu_0$ respectively denote the permittivity and permeability of free space. From Maxwell's equations one derives the following linear wave equations $$\varepsilon_0 \mu_0 \frac{\partial^2 E}{\partial t^2} = \nabla^2 E$$

$$\varepsilon_0 \mu_0 \frac{\partial^2 B}{\partial t^2} = \nabla^2 B$$

which implies that $$c = 1/\sqrt{\epsilon_0 \mu_0}$$

for the wave (phase) speed c.

To specify the polarization state of electromagnetic waves we look for the harmonic traveling plane wave solutions of the electric field wave equation describing the waves propagating in the z-direction. In orthogonal coordinates XYZ, these solutions are given by $$E(z,t) = E_x i + E_y j = E_{0x} \cos(\omega - kz) i + E_{0x} \cos(\omega - kz + \delta) j$$

where $\omega$ is the angular frequency, $\delta$ denotes the phase angle difference between the x and y components of electric field, k is the z-component of wave number vector which is related to the wavelength $\lambda$ with $|k| = 2\pi/\lambda$ and parallel to the direction of propagation, $E_{0x}$ and $E_{0y}$ are the (positive) amplitudes of x and y components of electric field components, respectively, and i and j are unit vectors in the x and y directions of the aforementioned Cartesian coordinate system XYZ.

Consider a situation in which the polarization states associated with the components $E_x$ and $E_y$ are given as $$E_x = E_{0x} \cos(\omega t - kz)$$

$$E_y = E_{0y} \cos(\omega t - kz + \delta)$$

Then the following characteristic can be defined:

a) For $\delta = 0 \pm 2\pi n$, n=1, 2, 3, ..., the electric field components are in phase and their ratio $E_x/E_y$ is a positive constant, in this case we have a so-called linearly polarized or plane polarized wave. The tip of electric field vector traces out a line in the xy-plane which defines the polarization direction, and $$E_x = E_{0x} \cos(\omega t - kz)$$

$$E_y = E_{0y} \cos(\omega t - kz)$$

b) For $\delta = -\pi \pm 2\pi n$, n=1, 2, 3, ..., we have an out of phase linear polarization with the component ratio equal to a negative constant, and $$E_x = E_{0x} \cos(\omega t - kz)$$

$$E_y = -E_{0y} \cos(\omega t - kz)$$

c) For $\delta = \pi/2 \pm 2\pi n$, n=1, 2, 3, ..., and $E_{x0} = E_{0y}$, the electric field vector rotates in the xy-plane clockwise (as seen against propagation) without changing its magnitude and it is in a state of right circular polarization, and $$E_x = E_{0x} \cos(\omega t - kz)$$

$$E_y = -E_{0y} \sin(\omega t - kz)$$

d) For $\delta = -\pi/2 \pm 2\pi n$, n=1, 2, 3, ... and $E_{x0} = E_{0y}$, the electric field rotates counterclockwise; this specifies a left circular polarization, and $$E_x = E_{0x} \cos(\omega t - kz)$$

$$E_y = E_{0y} \sin(\omega t - kz)$$

e) For $\delta = \pi/2 \pm 2\pi n$, n=1, 2, 3, ... and $E_{x0} \neq E_{0y}$, we have a more general case of right elliptical polarization. Electric field components have different amplitudes and the y-component leads with ninety degrees of phase; the tip electric field vector rotates clockwise and traces out an ellipse, and $$E_x = E_{0x} \cos(\omega t - kz)$$

$$E_y = -E_{0y} \sin(\omega t - kz)$$

f) For $\delta = -\pi/2 \pm 2\pi n$, n=1, 2, 3, ... and $E_{x0} \neq E_{0y}$, the electric field rotates counterclockwise and its tip again traces out an ellipse; this is a state of left elliptical polarization.

In the general case $$E_x = E_{0x} \cos(\omega t - kz)$$

$$E_y = E_{0y} \cos(\omega t - kz + \delta)$$

where the magnitudes of electric field components $E_{0x}$ and $E_{0y}$ are not necessarily equal and value of the phase difference $\delta$ is arbitrary, one can derive the curve traced out by the tip of electric field vector in the xy-plane (which is the plane of electric field components). By eliminating the phase ($\omega t - kz$) we obtain $$\left(\frac{E_x}{E_{0x}}\right)^2 + \left(\frac{E_y}{E_{0y}}\right)^2 - 2\left(\frac{E_x}{E_{0x}}\right)\left(\frac{E_y}{E_{0y}}\right)\cos\delta = \sin^2\delta$$

which specifies a tilted ellipse in $E_x$ and $E_y$ coordinates. The azimuth angle $\psi$ ($0 \leq \psi \leq \pi/2$) between the x-axis and the major semi-axis of this ellipse then becomes $$\tan 2\psi = \left(\frac{2E_{0x}E_{0y}}{E_{0x}^2 - E_{0y}^2}\right)\cos\delta$$

The following relations are also valid between the amplitudes of the electric field components and the lengths a and b of semi-major and semi-minor axes which specify the ellipticity of the polarization ellipse:

1. $a^2 + b^2 = E_{0x}^2 + E_{0y}^2$

2. $2 \cdot a\,b = \pm E_{0x}^2 E_{0y}^2 \sin\delta$ where the signs specify the sense of electric field rotation.

3. $\tan 2\psi = \tan a \cos\delta$ where $\tan a \equiv E_{0x}/E_{0y}$ and $0 \leq a \leq \pi/2$ 4. $\sin 2\phi = -\tan a \sin\delta$ with $\tan\phi = \pm(b/a)$, where $-(\pi/4) \leq \phi \leq (\pi/4)$.

For the phase difference $\delta=0$ and $\delta=\pi$, the ellipse degenerates to $$E_y = \pm \left(\frac{E_{0y}}{E_{0x}}\right) E_x$$

which is the equation of a straight line, and it specifies a linear polarization.

For $\delta=\pm\pi/2$ and $E_{0x}=E_{0y}=E_0$, the elliptical polarization curve reduces to a circle, which defines a circular polarization $$E_x^2 + E_y^2 = E_0^2$$

The novel methods disclosed herein utilize amplitude modulation of at least two synchronized polarized Radio Frequency (RF) carrier signals with an appropriate relationship between their amplitude modulation of their electric field components and their polarization states to provide a scanning polarized RF reference source with the desired scanning range, pattern and frequency. The polarized RF carrier signals are preferably in GHz range to yield relatively small scanning polarized RF reference sources.

As it is noted above, at least two synchronized polarized Radio Frequency (RF) carrier signals with appropriate relationship between their amplitude modulation are required to construct the disclosed polarized RF reference sources with scanning capability. In the following formulations and for the sake of making the formulations simple, the present novel method of providing scanning polarized RF reference sources is described for two synchronized polarized Radio Frequency (RF) carrier signals $E_1$ and $E_2$, where both are linearly polarized, one with only a component in the x and one with only a component in they direction of the aforementioned Cartesian coordinate system XYZ, as $$E_1 = E_x \cos(\omega - kz)i$$

$$E_2 = E_y \cos(\omega - kz + \delta)j$$

where $\omega$ is the angular frequency, $\delta$ denotes the phase angle difference between the two electric fields, x and y components of electric field, k is the z-component of wave number vector. It is sufficient to concentrate on the behavior of this field in the z=0 plane to see the effects of amplitude modulation. Formally amplitude modulation is represented by replacing the amplitudes $E_x$ and $E_y$ of the above electric fields by functions of time as $$E_x = A_x(t)\cos(\omega t)$$

$$E_y = A_y(t)\cos(\omega t + \delta)$$

where the modulation amplitudes $A_x$ and $A_y$ may be any functions, but preferably a superposition of many harmonic functions corresponding to a range of modulation frequencies and they can represent various waveforms. In general, the variations of modulation amplitudes are desired to be significantly slower relative to the fast oscillations of the carrier waves, i.e., they are almost 'constant' on a time duration of the order of one period of these fast oscillations.

A relatively simple amplitude modulation of the above polarized carrier waves may be selected as $$E_x = E_0 x(1+m_x \sin \Omega t)\cos \omega t$$

$$E_y = E_0 y(1+m_y \sin \Omega t)\cos(\omega t + \delta)$$

where $\Omega$ is the angular modulation frequency (in our case, the scanning frequency of the desired scanning polarized RF reference source), which is much smaller than $\omega$ and the constants $m_x$ and $m_y$ denote the modulation indices of x and y components. These indices are generally smaller than unity to avoid 'over-modulation'. Specifically we may, for example, choose a left elliptical polarization (counterclockwise rotation) by setting $\delta=-\pi/2$ and write $$E_x = E_0 x(1+m_x \sin \Omega t)\cos \omega t$$

$$E_y = E_0 y(1 \pm m_y \sin \Omega t)\sin \omega t$$

These components are not periodic functions of a single common frequency and the curve defined by the electric field vector is not 'closed'; however a particular value of the modulation frequency $\Omega$ can be chosen to satisfy these conditions. Let us impose the condition that there is a common period T between the modulation and carrier signals. The periodicity condition for the x-component $$E_x = E_0 x[1+m_x \sin \Omega(t+T)] \cos \omega(t+T) = E_0 x(1+m_x \sin \Omega t)\cos \omega t$$

is satisfied if $$\Omega = \frac{n}{m}\omega$$

for some integers n and m. Thus if the ratio of modulation and carrier frequencies is a rational number then one can choose a single period for the x-component (same is also true for the y-component). In addition, to have a periodic (closed) curve traced out by the tip of electric field vector there must be a common period between the field components.

The components $E_x$ and $E_y$ can also be written as $$E_x = E_{0x}\cos\omega t + \frac{E_{0x} m_x}{2}\sin[(\omega+\Omega)t] - \frac{E_{0x} m_x}{2}\sin[(\omega-\Omega)t]$$

$$E_x = E_{0y}\sin\omega t + \frac{E_{0y} m_y}{2}\cos[(\omega-\Omega)t] - \frac{E_{0y} m_y}{2}\cos[(\omega+\Omega)t]$$

which reveal the sideband frequencies $\omega-\Omega$ and $\omega+\Omega$. The ellipse equation specified by the tip of modulated electric field (for $\delta=-\pi/2$) transforms to $$\frac{1}{M_x^2}\left(\frac{E_x}{E_{0x}}\right)^2 + \frac{1}{M_y^2}\left(\frac{E_y}{E_{0y}}\right)^2 = 1$$

where we set $$M_x = (1+m_x \sin \Omega t)$$

$$M_y = (1+m_y \sin \Omega t)$$

This represents a 'modulated ellipse' whose semi-major and semi-minor 'axes' change their lengths periodically and relatively slowly with a frequency $\Omega$. If the magnitudes of the electric field components are equal, say to $E_0$, the circular polarization is modulated to an elliptical one with periodically changing axial lengths as described by $$\left(\frac{E_x}{E_0 M_x}\right)^2 + \left(\frac{E_y}{E_0 M_y}\right)^2 = 1$$

One embodiment is the general case of linear polarization in which the slope of polarization plane is replaced by a periodic function, $$E_y = \pm \frac{E_y}{E_{0x}} \left( \frac{1 + m_y \sin \Omega t}{1 + m_x \sin \Omega t} \right) E_x \quad (1)$$

Thus if the modulation indices of the two components of the electric fields $E_0$, and $E_{0y}$ are equal (i.e., if $m_y=m_x$), then the slope of polarization line remains the same. This is obviously not of interest since the polarization line is not varied over a certain range, i.e., the resulting polarized RF reference source does not have a scanning feature.

However, if for example, only the y-component is modulated, i.e., if $m_x=0$, and an in-phase polarization is considered, the slope of polarization line is replaced by a simple periodically changing function given in equation (2), and the polarization line would vary over a certain range depending on the values of the parameters $m_y$, $E_{0x}$, and $E_{0y}$, and the resulting polarized RF reference would therefore become a scanning polarized RF reference source;

$$E_y = \frac{E_y}{E_{0x}} (1 + m_y \sin \Omega t) E_x \quad (2)$$

which is the 'trace' of curve $$E_x = E_{0x} \cos \omega t$$

$$E_y = E_{0y}(1 + m_y \sin \Omega t) \cos \omega t \quad (3)$$

True trace, set of points ($E_x$, $E_y$) lying on the curve, is obtained by entirely eliminating the time variable $$E_y = \frac{E_y}{E_{0x}} \left\{ 1 + m_y \sin \left[ \left( \frac{\Omega}{\omega} \right) \cos^{-1} \left( \frac{E_x}{E_{0x}} \right) \right] \right\} E_x \quad (4)$$

For $\Omega \ll \omega$ sin function can be approximated by its argument, reducing the curve to $$E_y = \frac{E_{0y}}{E_{0x}} \left[ 1 + m_y \left( \frac{\Omega}{\omega} \right) \cos^{-1} \left( \frac{E_x}{E_{0x}} \right) \right] E_x \quad (5)$$

The equation (1) represents one of the simplest (harmonic) classes of amplitude modulation for the present novel scanning polarized RF reference sources constructed with two synchronized polarized Radio Frequency (RF) carrier signals with appropriate relationship between their amplitude modulation. It will however, be appreciated by those of ordinary skill in the art that an infinite number of such classes of periodic and even non-periodic functions may be formed with two or more synchronized polarized Radio Frequency (RF) carrier signals with appropriate relationship between their amplitude modulation to obtain varieties of preferably periodic and even non-periodic scanning ranges, rates and "scanning pattern" (hereinafter, the time history of the polarization line is referred to as the "scanning pattern").

In addition, even though the above two superimposed linearly polarized plane waves were in orthogonal directions, the only requirement to achieve the desired scanning range and pattern is that the two (or more) waves not be collinear. In fact, for relatively small scanning ranges, the E vector of the two linearly polarized plane waves may be desired to be less than 90 degrees apart to minimize the required scanner power for the same power levels at the receiving sensor position.

It is noted that the selection of an appropriate scanning pattern is dependent on the application at hand, for example for the polarized RF angular orientation measurement sensors previously described, and the algorithms used to extract the desired information, for example peak detection and/or pattern matching for angular orientation measurement.

In one embodiment, the classes of amplitude modulation represented by equation (1) is used to construct scanning polarized RF reference sources with two synchronized polarized Radio Frequency (RF) carrier signals as previously described. One of the simplest versions of this class of amplitude modulation may be obtained by setting the component $m_x=0$, thereby obtaining a "scanning pattern" that consists of a simple harmonic motion, equation (2). For the simple harmonic scanning pattern given by equation (2), the parameters consisting of the constant magnitudes of the two components of the electric fields $E_0$, and $E_{0y}$ and the constant modulation index of the y component $m_y$, determine the mean direction of the polarization line and the range of the scanning angle.

Figure 3:
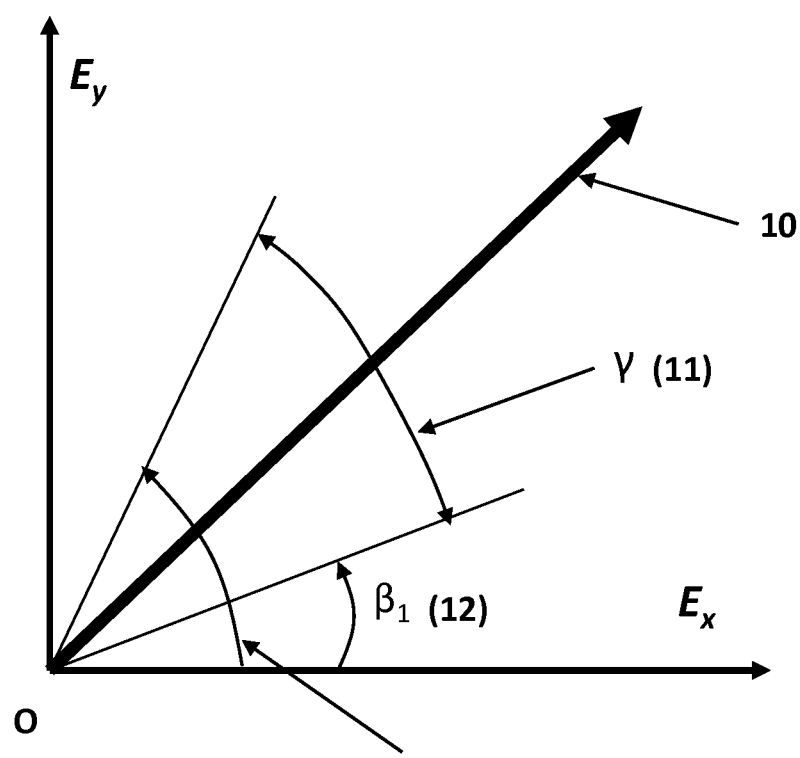
FIG. 3 illustrates a graph where $m_x=0$, $m_y=0.5$, and $E_{0x}=E_{0y}$, and the reference sources are positioned at the origin of the Cartesian XY coordinate system O.

For example, consider the case of $m_x=0$, $m_y=0.5$, and $E_{0x}=E_{0y}$, and considering that the reference sources are positioned at the origin of the Cartesian XY coordinate system O, FIG. 3. Then the polarization line 10 is readily shown to scan from the angle $\beta_1=26.6$ deg. (obtained by setting Sin $\Omega t=-1$ in equation (2) to obtain the slope of the polarization line, i.e., $\beta_1=\tan^{-1} (E_y/E_x)=\tan^{-1} (0.5)=26.6$ deg.), also indicated as numeral 12 in FIG. 3, to $\beta 2=56.3$ deg. (obtained by setting Sin $\Omega t=1$ in equation (2) to obtain the slope of the polarization line, i.e., $\beta_2=\tan^{-1} (E_y/E_x)=\tan^{-1} (1.5)=56.3$ deg.), also indicated as numeral 13 in FIG. 3, for a total range of the scanning angle of about $\gamma=29.7$ degrees, also indicated as numeral 11 in FIG. 3.

As can be seen in FIG. 3, with the selected parameters for the scanning pattern described by equation (2), a range of about 29.7 degrees 11 can be scanned. In a similar manner, by choosing different values for the constant parameters $m_x$, $m_y$, $E_{0x}$, and $E_{0y}$, different mean direction and scanning ranges are obtained with the scanning pattern described by the equation (1).

In general, any desired scanning pattern may be implemented with the disclosed method. For example, one may choose scanning patterns with peaks that are sharper than a simple harmonic sine wave, thereby increasing the accuracy of a peak detection algorithm. Alternatively, one may add specially designed patterns that will simplify a pattern detection algorithm being used and/or to reject noise, and/or to reduce their susceptibility to detection and jamming, or for other application specific purposes.

It is also noted that the disclosed method may also be used to provide two or more simultaneous and arbitrarily oriented scanning reference sources. Such multi-range scanning is useful for the establishment of a network of reference sources (and when desired a network of reference coordinate systems) to limit the scanning range when multiple sensors (for example, munitions and/or weapon platforms) are using the reference source in order to minimize the amount of power required by the reference sources and to minimize detection.

It is noted that the linearly polarized and synchronized Radio Frequency (RF) carrier signals used to construct the disclosed scanning polarized RF reference sources (for example, the two linearly polarized plane waves $E_y$ and $E_x$. of equation (2) that were superimposed in the above formulations) may be generated using almost any of the methods and devices that are commonly used in the art, including by using aperture antennas. It is also noted that in many applications, such as in the guidance and control of most mobile platforms, the angular orientation and/or position information may not need to be known as a continuous function of time and information may be required (for example for guidance and control purposes) only at discrete and sometimes even at infrequent points of time. In such applications, the scanning polarized RF reference source needs to provide its signal only when the aforementioned angular orientation and/or position information is needed onboard the mobile platform.

In another embodiment, at least two scanning polarized RF reference sources may be used so that the aforementioned polarized RF based angular orientation sensors, for example mounted on a mobile platform, can determine the position and/or orientation of the sensors, i.e., the mobile platform, relative to the scanning polarized RF reference sources.

Figure 4:
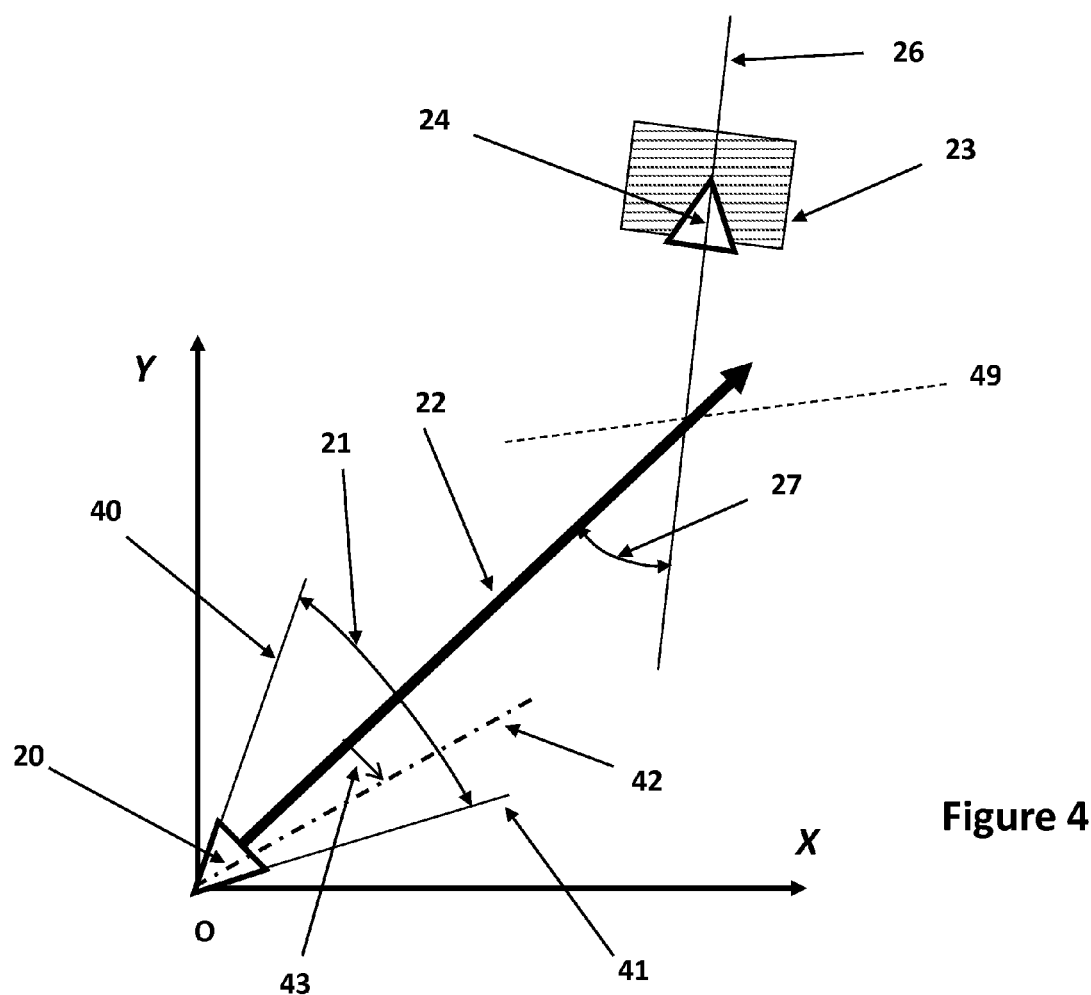
FIG. 4 illustrates a scanning polarized RF reference source positioned at the origin of the Cartesian XYZ coordinate system with an arbitrarily oriented polarized RF sensor positioned in its scanning field of view.

Now consider the situation in which a scanning polarized RF reference source 20 is positioned at the origin O of the Cartesian XYZ coordinate system as shown in FIG. 4. The scanning polarized RF reference source 20 is considered to have a scanning range 21, with the mean direction of the polarization line (for example, with a simple harmonic pattern previously described) indicated by the vector 22. Now let an object (e.g., a mobile platform) 23 with an embedded aforementioned polarized RF angular orientation sensor 24 that is properly designed to receive the carrier frequency signal to be positioned as shown in FIG. 4. Also consider the situation in which the scanning pattern of the scanning polarized RF reference source 20 is a simple harmonic pattern similar to those previously described. Then using well known or disclosed peak detection techniques, the angular orientation of the polarized RF angular orientation sensor 24 relative to the scanning polarized RF reference source 20, i.e., the angle between the direction 26 (the direction of maximum sensor sensitivity to incoming polarized RF waves) and the mean direction of the polarization line indicated by the vector 22, as indicated by the numeral 27 in FIG. 4, can determined.

It is noted that with the aforementioned simple harmonic scanning pattern, when the line 26 is parallel to the mean direction of the polarization line 22, then the signal received at the polarized RF angular orientation sensor 24 becomes symmetrical and is substantially a simple harmonic signal (neglecting any noise and other commonly present sources of distortion). Otherwise, the signal received by the sensor 24 is distorted with the peak leaning to one side or the other depending on the angle between the lines 26 and 22. This characteristic of the received signal is readily used to determine the aforementioned angular orientation of the polarized RF angular orientation sensor 24 relative to the mean direction of the polarization line 22 of the scanning polarized RF reference source 20 as described later in this disclosure.

Figure 5:
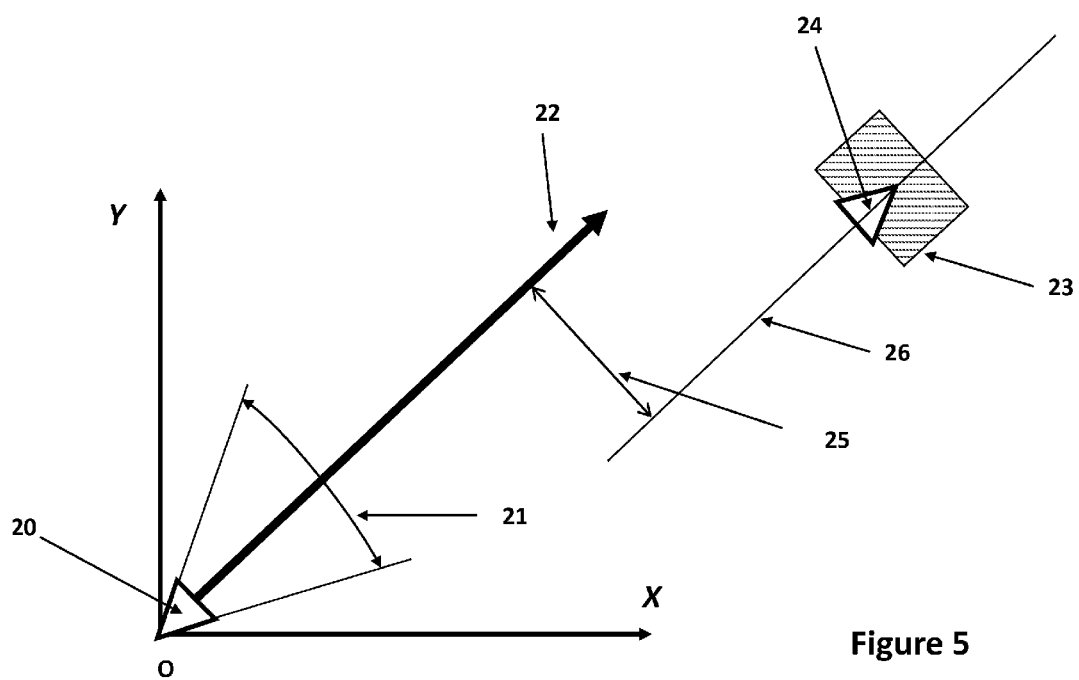
FIG. 5 illustrates a scanning polarized RF reference source positioned at the origin of the Cartesian XYZ coordinate system with a polarized RF sensor oriented to receive maximum signal in near-field of the scanning polarized RF reference source.

Now consider the case in which the orientation of the polarized RF sensor 24 indicated by the line 26 is parallel to the mean direction of the polarization line 22 as shown in FIG. 5 with an offset distance indicated by the numeral 25. If the distance between the polarized RF sensor 24 and the scanning polarized RF reference source 20 is relatively small, i.e., if the polarized RF sensor 24 is in near-field of the scanning polarized RF reference source, then the signal received at the polarized RF angular orientation sensor 24 is maximum when the distance 25 between the lines 26 and 22 is zero.

In which case, with the aforementioned simple harmonic scanning pattern of the scanning polarized RF reference source 20, the signal received by the polarized RF angular orientation sensor 24 is also substantially a simple harmonic signal (neglecting any noise and other commonly present sources of distortion). However, if the distance 25 between the lines 26 and 22 is not zero, the signal received by the sensor 24 is generally distorted with the peak leaning to one side or the other depending on whether the line 26 is placed below the mean direction of the polarization line 22 (as shown in FIG. 5) or on its opposite side.

The amount of above peak distortion would therefore serve as a sensory information indicating the direction that the mobile platform 23 has to travel (perpendicular to the line 26) in order to reduce the distance 25, and would also provide the information onboard the mobile platform 23 indicating when it is positioned along the mean direction of the polarization line 22, i.e., when the magnitude of the signal becomes maximum. It can therefore be said that the polarized RF angular orientation sensor 24 that is attached to the mobile platform 23 can use the signal from the scanning polarized RF reference source 20 to "home-in" and align itself to the mean direction of the polarization line 22. It is noted that if the distance between the scanning polarized RF reference source 20 and the line 26 is known, then for an arbitrary positioning of the mobile platform 23, the distance 25 between the lines 22 and 26 can in general be determined from the magnitude of the received signal.

Figure 6:
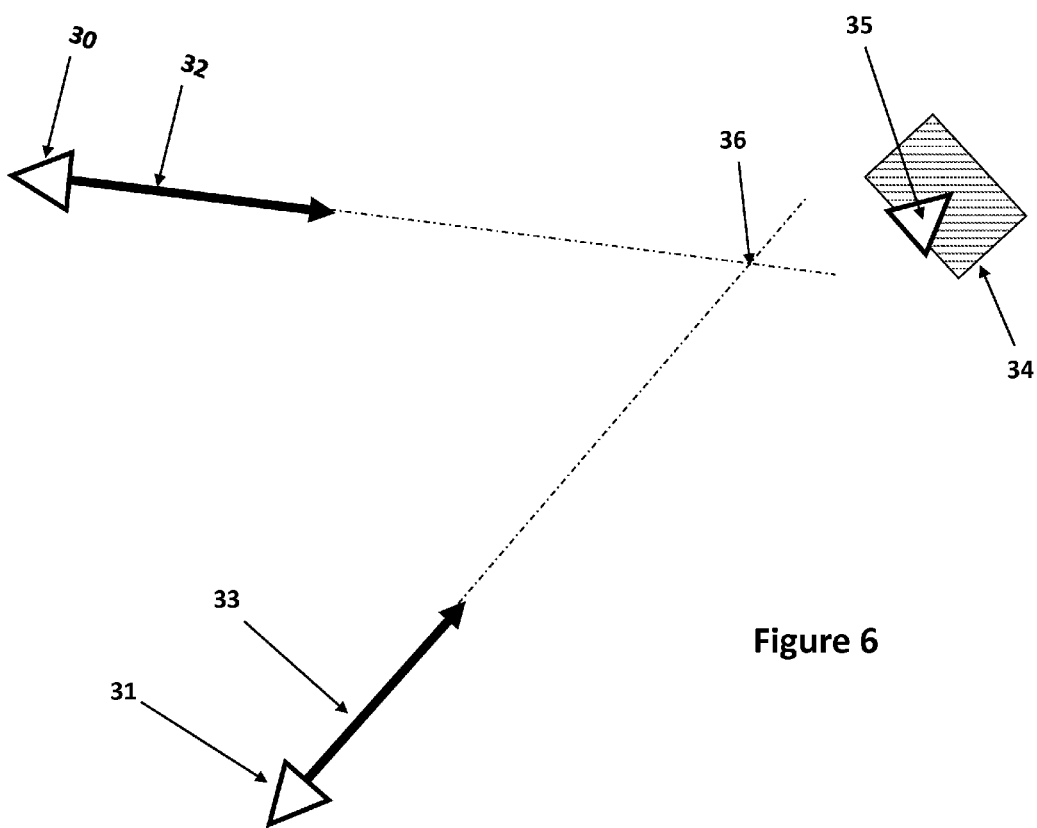
FIG. 6 illustrates a scanning polarized RF reference source positioned at the origin of the Cartesian XYZ reference coordinate system with arbitrarily deployed scanning polarized RF reference sources to establish a position and/or orientation reference coordinate system for objects using polarized RF sensors to determine their full position and/or orientation relative to the coordinate system.

Now consider the situation in which two (or more) scanning polarized RF reference sources 30 and 31 with corresponding mean directions of the polarization lines 32 and 33, respectively, are used as shown in FIG. 6. Let also a mobile platform 34 with at least one polarized RF angular orientation sensor 35 be positioned somewhere a distance away but in the near-field of the scanning range of the two scanning polarized RF reference sources 30 and 31 as shown in FIG. 6.

Using the method described above, the pattern of the signal received at the polarized RF angular orientation sensor 35 from each one of the two scanning polarized RF reference sources 30 and 31 would provide sensory information to the mobile platform 34 for guidance (homing-in) towards the mean direction of the polarization lines 32 and 33, i.e., towards the point of their intersection 36. The only requirement for this mode of operation of the scanning polarized RF reference sources is that the two mean directions of the polarization lines 32 and 33 are not parallel.

It is noted that the polarization lines 32 and 33 are in fact the intersections of planes of polarization with the XYplane (FIG. 5). The aforementioned point of intersection 36 (FIG. 6) is also a line perpendicular to the above XYplane and directed parallel to the Z axis of the Cartesian XYZ coordinate system (FIG. 5).

It is noted that by varying the direction of the polarization line 32 and 33 (FIG. 5), the point of their intersection 36 towards which the mobile platform 34 is guided can be changed in a dynamic mode.

It is also noted that by using at least three scanning polarized RF reference sources that are properly oriented, a mobile platform may be directed to any position in space.

In general, by using more scanning polarized RF reference sources than are necessary, the positioning precision of the above methods is increased.

It is noted that for the embodiments of FIG. 5 (FIG. 6) to work, the sensor 24 (sensor 35) has to be in near field of the scanning polarized RF reference source 20 (30 and 31), which is relatively short if frequency of the reference source is high. For this reason, the present scheme is useful mostly for operations like assembly operations using robot manipulators or the like in which the sensor is in the near field of the reference source.

Now consider the situation in which a scanning polarized RF reference source 20 is positioned at the origin O of the Cartesian XYZ coordinate system as shown in FIG. 4. The scanning polarized RF reference source 20 is considered to have a scanning range 21, with the mean direction of the polarization plane as indicated by the vector 22 (for example, symmetrically positioned as with a simple harmonic pattern previously described). Now let an object (e.g., a mobile platform) 23 with an embedded aforementioned polarized RF angular orientation sensor 24 that is properly designed to receive the carrier frequency signal to be positioned as shown in FIG. 4 far field from the reference source 20. Also consider the situation in which the scanning pattern of the scanning polarized RF reference source 20 is a simple harmonic pattern similar to those previously described. Also let the direction of maximum sensor sensitivity to incoming polarized RF waves be in the direction indicated by the numeral 26 in FIG. 4.

It is noted that with the aforementioned simple harmonic scanning pattern, when the line 26 is parallel to the mean direction of the polarization plane as indicated by the line 22, then the signal received at the polarized RF angular orientation sensor 24 becomes symmetrical (neglecting any noise and other commonly present sources of distortion). Otherwise, the signal received by the sensor 24 is distorted with the peak leaning to one side or the other depending on the angle between the lines 26 and 22. This characteristic of the received signal can be used to determine the angle 27, i.e., the angular orientation of the line 26 of the polarized RF angular orientation sensor 24 relative to the mean direction of the polarization line 22 of the scanning polarized RF reference source 20 as described in the following embodiment of the present invention.

Figure 7:
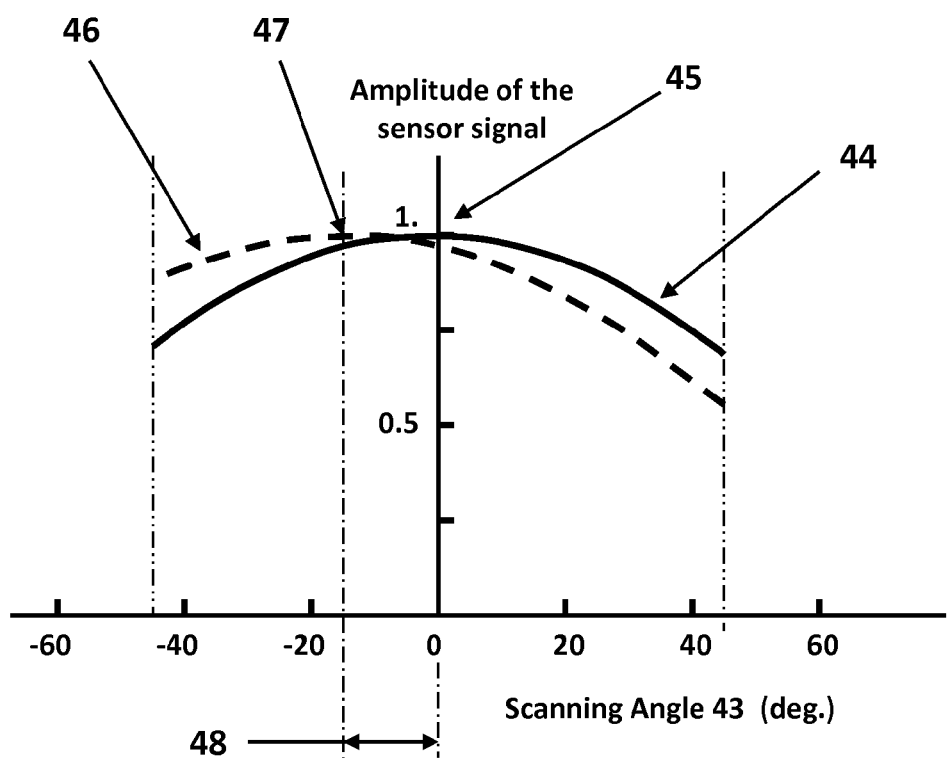
FIG. 7 illustrates a plot of an amplitude of a sensor output signal as a function of a scanning source angle according to an embodiment of the systems and methods for angular orientation measurement.

Let the current position of the plane of polarization of the scanning source 42 (FIG. 4) be indicated by its position relative to the mean direction of the polarization plane 22 by the angle 43. The angle 43 of the plane 42 from the mean direction 22 is considered to be positive as measured from the direction 22 when measured in the clockwise direction (as shown in FIG. 4), and negative when measured in the opposite direction, i.e., counter-clockwise from the direction 22. Considering the aforementioned simple harmonic scanning pattern, when the line 26 is parallel to the mean direction of the polarization plane 22, then the signal received at the polarized RF angular orientation sensor 24 becomes symmetrical relative to the zero scanning angle 43 as shown in FIG. 7 by a typical plot 44 of the amplitude of the sensor output signal (sensor measurement) as a function of the scanning source angle 43. In the present example, the scanning range of the reference source 21 (FIG. 4) is considered to be 60 degrees. In addition, in the plots of FIG. 7, for simplicity, the sensor output signal is shown to be normalized to one. As can be seen, the peak 45 of the sensor measurement is at zero scanning angle 43, making the plot of the curve 44 symmetric. In the present orientation of the sensor (i.e., the line 26) relative to the scanning reference source (i.e., the mean direction of the plane of polarization 22), the angle between the lines 22 and 26, i.e., the angle 27 in FIG. 4, is obviously zero.

Now consider the situation in which the angle between the lines 22 and 26, i.e., the angle 27, is non-zero, for example equal to 15 degrees. Then as the reference source plane of polarization 42 scans the full scanning range 21, when the plane of polarization 42 makes an angle 43 of −15 degrees, the plane 42 (line 42 as seen by the intersection of the plane of polarization 42 with the XY plane) becomes parallel with the direction 26 of maximum sensor sensitivity, thereby resulting in maximum (peak) 47 of the sensor 24 output (measurement) to occur at this angular positioning 43 of the sensor output curve plot 46 (dashed line) over the entire 60 degrees scanning range 21 of the scanning reference source as shown in FIG. 7. This provides a method for determining the angle that the sensor (line 26) makes with the mean direction of the polarization plane 22 of the scanning reference source 20. The method can be readily seen to consist of measuring the angle offset (in the present case 48 in FIG. 7) from the zero angle 43 (mid-range of the scanning range 21). When the angle offset 48 is negative (like is the case in the plot of FIG. 7), then the angle 27 is equal to the angle offset 48 as shown in FIG. 4. When the angle offset 48 is positive, then the angle 27 is still equal to the angle offset 48, with the difference that the line (sensor direction) 26 is positioned on the opposite side of the line 22 as shown by the dashed line 49 in FIG. 4.

It is however noted that in the configuration shown in FIG. 4, the sensor 24 is unaware if a signal received from the scanning reference source 20 at certain angle from the zero scanning angle 43 corresponds to the angle value in the positive (clockwise) or negative (counter-clockwise) direction of the angle 43, FIG. 4. Similarly, if the signal received by the sensor 24 is the one indicated by the curve 46 in FIG. 7, the angle offset 48 indicated by the peak 47 may correspond to and angle 27 as shown in FIG. 4 or its opposite indicated by the line 49 (symmetrical to the direction 22), indicating that the sensor 24 is located along the line 49. This requires added information to be provided to make it possible to distinguish between the above two possibilities.

In one embodiment of the present invention, the added information is a modulated (non-symmetrical about the zero scanning angle) signal over the carrier signal of the scanning polarized reference source 20 that is synchronized with the scanning frequency of the scanning polarized reference source to differentiate the positive and negative angles 43, thereby determine if the angle 48 indicated by the peak 47 corresponds to an angle 27 that positions the sensor 24 along the line 26 or the line 49 (FIG. 4). It is appreciated by those familiar with the art that any type of non-symmetrical modulated signal may be used for this purpose. A simple example of such a modulated signal may be a short pulse that is added when the plane of polarization of the scanning reference source 42 is at one of its extreme positions 40 or 41, thereby indicating the current direction of the plane of polarization of the scanning reference source 42 with which the position of the peak 47 can be referenced to determine the correct direction of the sensor 24, i.e., for the measured angle 48, whether the sensor is positioned along the line 26 or the line 49. It is appreciated by those familiar with the art that pulse may be of any form and that it does not have to be added to the extreme positions 40 or 41 of the scanning range as long as its position and form is known to the sensor 24. For example, the modulated signal may be a signal that adds the output indicated by 53 to the sensor output 50 shown in FIG. 8, corresponding to the aforementioned sensor output 46 (FIG. 7) on the positive scanning angle 43 portion of the scanning polarized reference source scanning range. The scanning angle 52 corresponding to the measure peak position 51 can then be determine whether it corresponds to the positioning of the sensor 24 (FIG. 4) along the line 26 or 49.

In an alternative embodiment of the present invention, after one or more scans, the scanning signal is turned off for certain amount of time. For example, scanning may start from the extreme position 40 (or 41), and after one or more scanning periods, the scanning signal is turned off when the plane of polarization of the scanning reference source is back to the extreme position 40 (or 41), thereby indicating the current direction of the plane of polarization of the scanning reference source 42 with which the position of the peak 47 can be referenced to determine the correct direction of the sensor 24, i.e., for the measured angle 48, whether the sensor is positioned along the line 26 or the line 49. It is appreciated by those familiar with the art that the scanning reference source signal does not have to be turned off at the extreme positions

40 or 41 of the scanning range but at any arbitrary position as long as this position is known to the sensor 24.

In yet another embodiment of the present invention, the scanning reference source signal may be synchronized with the clock of the processor used onboard the object 23, FIG. 4, for the processing of the signal received by the sensor 24 to compute the angle 27. In such a case, the sensor 24 is at all times aware of the exact angle 43 of the plane of polarization of the scanning reference source 42 with respect to the direction zero scanning angle 22 (the mean direction of the polarization plane as indicated by the line). The sensor 24 can thereby determine the correct direction of the sensor 24, i.e., for the measured angle 48, whether the sensor is positioned along the line 26 or the line 49.

In the above embodiments of the present invention, the angle 27 (between the mean direction of the polarization plane 22 and the direction of maximum sensor sensitivity 26) is determined by detecting the position of the peak sensor output during a full scan of the scanning polarized RF reference source 20 within its full scanning range 21 of reference source 20 (FIG. 4). The accuracy with which the angle 27 is measures will then depend on the accuracy with which the relative position of the sensor peak is measured (in the above examples, the position of the peak 47 relative to the zero scanning angle position (zero angle 43).

The accuracy with which the angle between the mean direction of the polarization plane 22 and the direction of maximum sensor sensitivity 26 (hereinafter used to indicate the orientation of the sensor 24) can be significantly enhanced and the sensitivity of the angle measurements to noise can be significantly reduced by the use of the following embodiments of the present invention.

Figure 9:
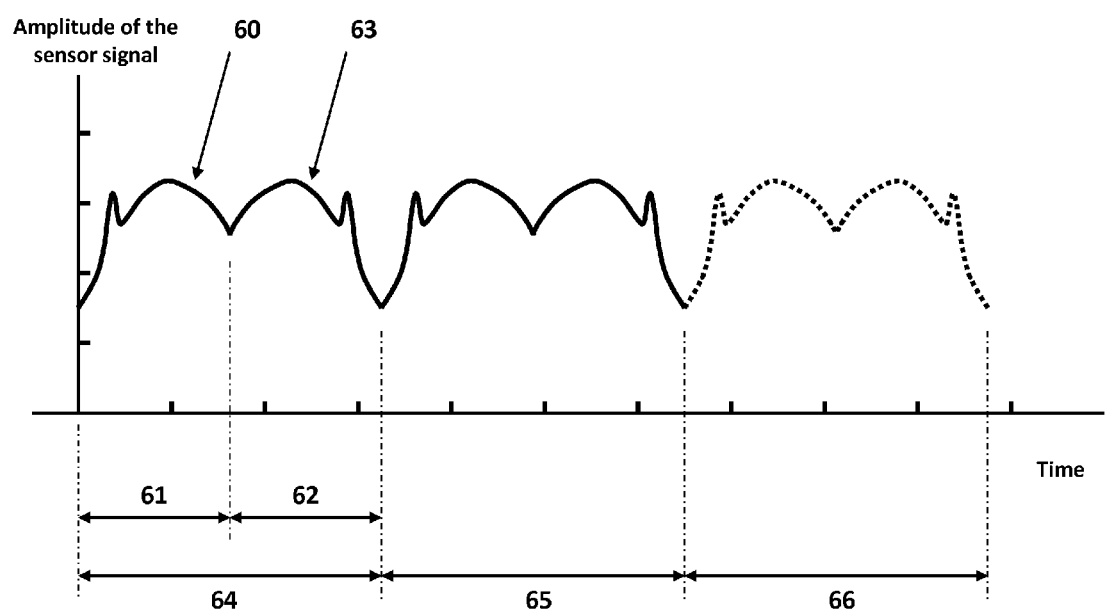
FIG. 9 illustrates a sensor output according to an embodiment of the systems and methods for angular orientation measurement.

Consider a scanning pattern such as the aforementioned simple harmonic scanning pattern with a modulated signal with which as the plane of polarization 42 rotates from its extreme position 40 to its other extreme position 41 to cover the full scanning range 21 as shown in FIG. 4, the sensor output is as shown in FIG. 9 by the curve 60. FIG. 9 is the plot of the sensor output as a function of time. In FIG. 9 the sensor output during the above period of time is indicated by the numeral 61. Considering that the scanning pattern with the modulated signal as the plane of polarization 42 rotates back from its extreme position 41 to its starting position 40 is a symmetrical pattern, the sensor output during this period of time 62 becomes the curve 63, which is the mirror image of the sensor output 60 during the period of time 61. This would make the scanning period for one full (back and forth) scanning of the scanning polarized RF reference source 20 to be the sum of the time periods indicated by 61 and 62 (indicated by the numeral 64 in FIG. 9), noting that for the considered simple harmonic scanning pattern, the time periods 61 and 62 are equal. If the above scanning pattern is repeated, then the sensor output pattern shown by the curves 60 and 63 (with the time period 64) is repeated as shown in FIG. 9 during the same time periods 65 and 66 and beyond (as long as the position of the sensor 24 relative to the reference source is not changed) and the output becomes a periodic function with the period 64 and the profile of curves 60 and 63.

Figure 8:
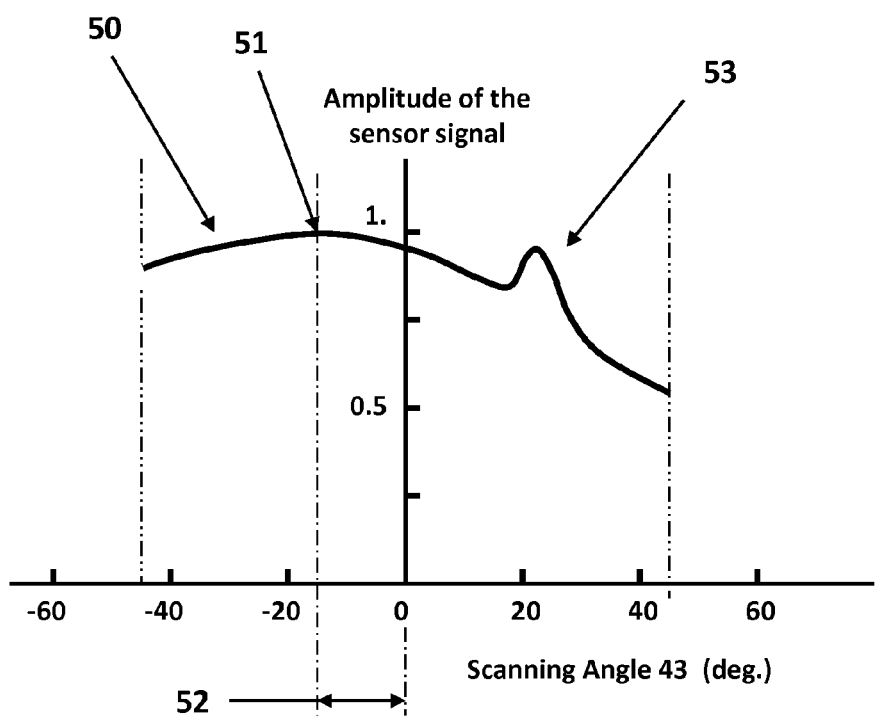
FIG. 8 illustrates the plot of FIG. 7 in which a modulated signal is added over a carrier signal of the scanning polarized reference source that is synchronized with the scanning frequency of the scanning polarized reference source to differentiate between positive and negative angles of the polarized RF sensor.

In one embodiment of the present invention, the angle 27 (FIG. 4) between the mean direction of the polarization plane 22 and the direction of maximum sensor sensitivity 26 is determined by the sensor processor by matching the measured pattern of the signal received at the sensor (the signal indicated by the curve 60 (or 63), i.e., half the period of the reference source scan; or preferably the signal for one full period of the reference source scan, i.e., the signal indicated by the curves 60 and 63) to (preferably) the calibrated (or the calculated) signal pattern that is expected at each angle 27. The peak of the matched curve (one peak if either curves 60 or 63 are used alone and two peaks if both measured signal curves 60 and 63 are used) will indicate the value of the angle 27 as was described for the previous embodiments of the present invention (FIGS. 7 and 8). The algorithm used to perform such a curve matching uses an analytical model of the measured or calculated sensor output curve as a function of the aforementioned angle 27. In general, the aforementioned analytical models are derived analytically if possible for the selected sensor geometry or are formulated by fitting the calibration measurements for different angular orientations of the sensor relative to the reference source, i.e., the angle 27, with appropriate, preferably simple analytic functions using well known curve fitting techniques. When it is done using the calibration measurements, depending on the complexity of the sensor output curves, the analytical description of the sensor output curves are generally formulated at certain number of discrete angles 27, and well known interpolation techniques are then used to approximate the model for in-between angles. It is noted that by selecting a modulated signal pattern that is not symmetrical with respect to the zero scanning angle 43 position, FIG. 4, it is readily determined if the sensor 24 is positioned along the line 26 or 49 as described for the previous embodiments of the present invention.

The method used in this embodiment of the present invention has the particular advantage of being very insensitive to the environmental and measurement noise. This is the case since in general such noises are high in frequency and relatively random and such curve matching techniques act as a filter to filter out the noise as well as the measure signal distortions. This is particularly the case since in general one would select relatively high polarized RF reference source scanning frequencies (e.g., in several or tens of KHz), thereby when measuring the angular orientation of physical objects such as munitions in flight, many cycles of sensor output measurements can be used to perform the aforementioned sensor output curve pattern matching computations before the orientation of the object is significantly varied (even for munitions traveling at very high-speeds). In addition, the present method will provide a more precise measurement of the sensor angle 27 since it does not rely on the accuracy of a single sensor output measurement (of the sensor output peak) but rather the measurement of the entire range of sensor output curve for at least one (preferably many) scanning periods. This is particularly the case since the sensor output curves are generally very flat near the peak points as can be observed in the plots of FIGS. 7-9.

It is appreciated by those familiar with the art that an infinite possible polarized RF scanning pattern and modulated signal could be used in the above embodiment of the present invention depending on the particular application at hand. Certain scanning patterns and/or modulated signals lend themselves more to achieving precision and/or noise insensitivity. In addition, certain scanning patterns and/or modulated signals require less or more computational requirement (i.e., signal processing) by the sensor processors, affecting the speed with which sensor information becomes available.

In yet another embodiment of the present invention, the scanning pattern and/or the modulated signal varies over time. In certain application, this embodiment provides great operational advantages. One main advantage of this embodiment is that the scanning pattern and/or modulated signal may be varied at a pre-determined manner which is only known to the sensor processor. As a result, the scanning pattern and the modulated signal cannot be used by any other sensor without the said scanning pattern and modulated signal information for angle measurement. Another main advantage of this embodiment is that it would make it very difficult for the polarized RF scanning source signal to be jammed or otherwise compromised.

It is appreciated by those familiar with the art that with a scanning pattern and the modulated signal, the sensor output pattern depends only on the angular orientation of the sensor relative to the mean direction of the polarization plane of the reference source (the angle 27 in FIG. 4). The amplitude of the sensor output is however dependent on the distance between the scanning reference source and the sensor. This characteristic of the sensor output allows the user to match the sensor output pattern as previously described to determine the angular orientation of the sensor relative to the mean direction of the polarization plane of the reference source, while either eliminating the sensor output (signal strength) from the sensor processing algorithm or considering the amplitude as a distance parameter and calculating it together with the said angular orientation of the sensor relative to the reference source. If the sensor output has been calibrated to determine the sensor output as a function of its distance relative to the reference source (or if this relationship is analytically available), the calculated distance parameter can them be used to determine the actual distance of the sensor from the reference source in addition to its said angular orientation when the sensor is in-line-of-sight of the reference source. This embodiment of the present invention has also the advantage of allowing the measurement of the said angular orientation of the sensor relative to the reference source (angle 27 in FIG. 4), even if the sensor is in non-line-of-sight of the reference source since in this configuration the sensor output pattern stays unchanged but only he sensor strength is reduced. The aforementioned distance measurement would, however, become less accurate.

As indicated previously, one objective of the present invention is to provide methods and apparatus for the establishment of reference coordinate systems using the aforementioned polarized RF reference sources with scanning capability. Such reference coordinate systems may be established for the purpose of indicating the position and/or the angular orientation of an object in the established reference coordinate system. The established reference coordinate system may be fixed, e.g., to the earth with its origin located at certain point, or may be moving, e.g., be fixed to a fixed and at times moving object or platform. In general, however, the origin of the established reference coordinate system is preferably located at one of the aforementioned scanning polarized RF reference sources, the position of which relative to the earth is accurately known or can be measured. The referencing coordinate system may be a Cartesian referencing coordinate system or any other coordinate system that is most appropriate for the tasks for which the coordinate system is being established. But in general, any coordinate system that can be used to uniquely indicate the position and/or the angular orientation of an object may be used.

There is, therefore a need for methods and apparatus for the establishment of reference coordinate systems using the aforementioned polarized RF reference sources with scanning capability. In addition, considering the fact that numerous different scanning reference source deployment and operational scenarios are possible, therefore such methods and apparatus must be capable of addressing all such possible deployment and operational scenarios. In the following, a number of such possible deployment and operational scenarios are described and embodiments that can be used for establishing the aforementioned position and/or orientation referencing systems are disclosed.

Figure 10:
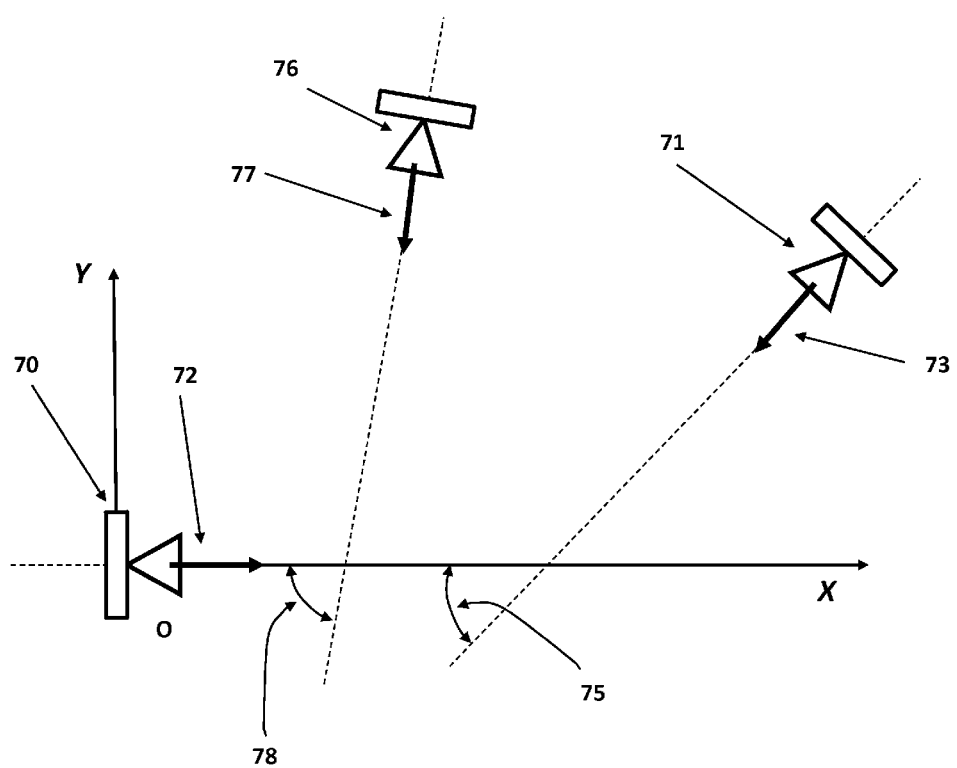
FIG. 10 illustrates two scanning polarized RF reference sources with corresponding mean directions of the polarization plane.

Now consider the situation in which two scanning polarized RF reference sources 70 and 71 with corresponding mean directions of the polarization plane shown by the lines 72 and 73, respectively, are used as shown in FIG. 10. Here, for the sake of simplicity, both planes of polarization 72 and 73 are considered to be perpendicular to the plane of the FIG. 10. A reference Cartesian coordinate system XYZ (Z axis considered to be perpendicular to the XY plane) is considered to be fixed to the scanning polarized RF reference sources 70, with its mean direction 72 of its polarization plane being in the XZ plane (thereby in the view of FIG. 10 being represented by the X-axis). It is noted that the latter assumption is made for the sake of convenience only and that one or both of the scanning polarized reference sources 70 and 71 may be moving in the XYZ coordinate system and relative to each other. In addition, the XYZ coordinate system may also be either fixed with respect to the earth or moving. Thereby the following description is applicable to any one of such scenarios or other similar scenarios. Hereinafter, the Cartesian XYZ coordinate system is referred to as the XYZ reference coordinate system or simply as the reference coordinate system.

In general, the established reference coordinate system (e.g., the Cartesian XYZ reference coordinate system of FIG. 10) may be assigned the role of "global" angular orientation and if desired, position and angular orientation reference coordinate system for objects equipped with polarized RF sensors.

In the schematic of FIG. 10, the position and orientation of the scanning polarized RF reference source 70 is considered to be known in the Cartesian XYZ coordinate system. The scanning polarized RF reference sources 70 and 72 are also considered to be provided each with at least one of the aforementioned polarized RF sensor (not shown), with their respective orientation being known relative to the corresponding mean directions of the polarization plane shown by the lines 72 and 73. The scanning polarized RF reference sources 70 and 72 are also considered to be provided each with RF or other two-way means of communication (the signals of which is preferably transmitted by the carrier signals of their corresponding scanning polarized RF reference sources). At least one of the scanning polarized RF reference sources 70 and 72 is also considered to be provided with processing units to perform the following described computations. Hereinafter and for the sake of convenience, the aforementioned assembly of scanning polarized reference source 70 (71) together with its attached polarized RF sensor, two-way communications gear, processing units and other required powering and electronics elements are referred to as the scanning polarized reference source 72 (73).

In this scenario, the position and orientation (hereinafter considered to be identified by the corresponding mean direction of their polarization plane—in FIG. 10 indicated by the line 72) of the scanning polarized RF reference source 70 in the XYZ coordinate system are considered to be known. However, the position and orientation of the scanning polarized RF reference source 71 in the XYZ coordinate system is not known and is to be determined.

The method of determining the orientation of the polarized RF sensor of the scanning polarized RF reference source 71 (i.e., scanning polarized RF reference source 71) relative to the scanning polarized RF reference source 70 (i.e., relative to mean directions of the polarization plane 72), as indicated by the angle between their mean directions of their polarization planes 72 and 73—indicated by the numeral 75 in FIG. 10), was previously described for the embodiment of FIG. 4. Thus, in the present scenario, once the relative orientation angle 75 is determined, the orientation of the scanning polarized RF reference source 71 relative to the XYZ coordinate system is also determined.

It is noted that as it was previously described, at least three scanning polarized RF reference sources, the planes of polarization of which must not be all perpendicular to the same plane (for the case of arrangement of FIG. 10, the plane of polarization of the third scanning polarized RF reference source must not be perpendicular to the XY plane) is generally required for an object equipped with polarized RF sensors (usually at least three sensors) to determine its full orientation relative to the XYZ coordinate system. Thus, at least three polarized RF sensors are needed on each scanning polarized RF reference sources so that each scanning polarized RF reference source becomes capable of determining its full orientation relative to the established XYZ reference coordinate system.

In a similar manner, if a similar third scanning polarized RF reference source 76 (with the aforementioned assembly of polarized RF sensor, communications gear, etc.) with the mean direction of its polarization plane 77 is also present or is introduced, then the aforementioned method can also be used to determine the orientation of its mean direction of its plane of polarization 77 relative to the mean direction of the polarization of the scanning polarized RF reference source 72, as indicated by the angle 78 in FIG. 10. The orientation of the scanning polarized RF reference source 76 in the XYZ coordinate system is thereby also determined. It is noted that since the plane of polarization of all three reference sources 70, 71 and 76 are perpendicular to the XY plane of the XYZ reference coordinate system; one of the reference sources becomes redundant. In general, it might be preferable to have redundant reference sources since multiple angular orientation (position if being measured) measurements can be used to increase the measurement accuracy using averaging or other estimation techniques. In other situations, the redundant reference sources may be needed to cover areas that are beyond the scanning coverage of any two scanning reference sources. The same discussion also holds for the case of full angular orientation measurement, i.e., in the case of the XYZ reference coordinate system of FIG. 10, the measurement of three independent angular orientations, e.g., angular orientations about the X, Y and Z-axes.

In one embodiment, the position and orientation of one scanning polarized RF reference source (such as the scanning polarized RF reference source 70 in FIG. 10) is known and is used to establish a reference coordinate system (such as the Cartesian XYZ reference coordinate system in FIG. 10). This scanning polarized RF reference source is hereinafter called the base reference source. Then other (at least two) scanning polarized RF reference sources are deployed arbitrarily (assuming that the resulting at least three scanning polarized reference sources are within each other scanning ranges). Each newly deployed scanning polarized RF reference source will then receive an incoming scanning polarized wave from the base reference source and uses its at least three polarized RF sensors to determine its orientation relative to the base reference source, thereby relative to the established reference coordinate system XYZ. The information is then transmitted to the base scanning reference source (or to the system controlling the use of the established angular orientation referencing system). As a result, any object within the range of the base and deployed scanning reference sources can use polarized RF sensors (at least three polarized RF sensors for full angular orientation measurement) to determine its angular orientation relative to the established reference coordinate system.

It is noted that once a reference coordinate system (e.g., the Cartesian coordinate system shown in FIG. 10) is established, any one of the scanning polarized RF reference sources can be selected to serve as the base reference source. In fact, none of the reference sources need to be fixed in the reference coordinate system and that the reference coordinate system may also be moving, for example, fixed to the system controlling the use of the established angular orientation referencing system.

It is also noted that the position of the deployed reference sources in the established reference coordinate system XYZ and/or relative to each other may, for example, be provided by GPS or as mentioned in the aforementioned U.S. Pat. Nos. 6,724,341 and 7,193,556 (the disclosures of which are incorporated herein by reference) by using three reference sources and triangulation techniques or by direct measurement of distance between scanning polarized RF reference sources, for example, using laser range finder or the like if they are in the line of sight. Once the position of the scanning reference sources are known (to the base scanning reference source and/or to the system controlling the use of the established angular orientation referencing system), then any object within the range of the base and deployed scanning reference sources can use polarized RF sensors (at least three polarized RF sensors for full angular orientation measurement) to determine its position and angular orientation relative to the established reference coordinate system.

It is appreciated by those skilled in the art that one may use a network of aforementioned scanning polarized RF reference sources to set up a network of such reference sources to establish one or more reference coordinate systems with or without overlapping coverage to cover designated regions of space for objects to measure their angular orientation and/or position relative to the establish reference coordinate systems. The network of scanning polarized RF reference sources may be provided with redundant reference sources to ensure that if some number of reference sources are disabled, run out of power, etc., the remaining reference sources could still keep the established reference coordinate system operational and capable of providing the scanning polarized RF signals for objects to determine their full angular orientation and/or position with respect to the said reference coordinate system as previously described. The use of redundant scanning polarized RF reference sources also has the advantage of providing multiple angular orientation and position measurements while establishing the aforementioned reference coordinate system(s), thereby providing the means of increasing its precision and the precision with which objects equipped with polarized RF sensors can determine their angular orientation and/or position relative to the established reference coordinate system(s).

It is also appreciated by those skilled in the art that the established reference coordinate system and its individual scanning polarized RF reference sources may be equipped with additional sensors and means of determining their position and angular orientation relative to other reference sources. Such means include GPS signal for position information or optical means used surveying, etc.

In a second embodiment, the reference coordinate system to be established by the scanning polarized RF reference sources is solely for the purpose of providing the means for objects equipped with the aforementioned polarized RF sensors to determine their orientation relative to the established reference coordinate system. In this embodiment, the position of the established reference coordinate system, e.g., the Cartesian XYZ coordinate system of FIG. 10, does not need to be known as long as its orientation (i.e., the direction of the X, Y and Z axes) relative to the base scanning polarized RF reference source (such as the scanning polarized RF reference source 70 in FIG. 10) is known. In general, the said orientation of the XYZ reference coordinate system is preferably fixed relative to the base scanning polarized RF reference source. The base scanning polarized RF reference source is provided with polarized RF sensors (at least three appropriately positioned sensors if full angular orientation is to be measured in the established reference coordinate system). Other scanning polarized RF reference sources are then deployed arbitrarily (assuming that the scanning polarized reference sources are within each other scanning ranges). However, unlike the above first embodiment, the deployed scanning polarized RF reference sources are not required to be provided with any polarized RF sensors. The base reference source receives incoming scanning polarized wave from each newly deployed scanning polarized RF reference sources and determines its orientation relative to each newly deployed scanning polarized RF reference source, thereby determines the orientation of each newly deployed scanning polarized RF reference source relative to the established reference coordinate system XYZ. The information is then transmitted to the base scanning reference source (or to the system controlling the use of the established angular orientation referencing system). As a result, any object within the range of the base and deployed scanning reference sources can use polarized RF sensors (at least three polarized RF sensors for full angular orientation measurement) to determine its angular orientation relative to the established reference coordinate system.

The aforementioned capability of arbitrarily deploying scanning polarized RF reference sources and using them to establish a full position and angular orientation reference coordinate system or a full angular orientation reference coordinate system that objects property equipped with polarized RF sensors could use to determine their angular position and/or orientation relative to the said reference coordinate system. This capability is very important since it would allow the deployment of such scanning polarized RF reference sources in inaccessible positions by, e.g., dropping them from the air.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for setting up a reference coordinate system, the method comprising:
using a base scanning polarized RF reference source having a polarized RF sensor,
deploying at least one other scanning polarized RF reference source;
determining a position and orientation of the base scanning polarized RF reference source relative to the reference coordinate system;
determining an orientation of the at least one other scanning polarized RF reference source relative to the base scanning polarized RF reference source using the polarized RF sensor.

2. The method of claim 1, wherein the at least one other polarized RF reference source comprises at least first and second scanning polarized RF reference sources.

3. The method of claim 2, further comprising determining an angular orientation of the first scanning polarized RF reference source relative to the second scanning polarized RF reference source.

4. The method of claim 1, wherein the reference coordinate system is fixed to the base scanning polarized RF reference source.

5. The method of claim 1, where the reference coordinate system is movable relative to the base scanning polarized RF reference source.

6. The method of claim 1, further comprising passing the determined orientation to a fired munitions and using the determined orientation onboard the fired munitions for determining their full angular orientation relative to the established reference coordinate system.

7. The method of claim 1, further comprising using the established reference coordinate system as a global angular orientation reference coordinate system for munitions, weapon platforms, or a fired munitions.

8. The method of claim 1, further comprising determining a position of the deployed at least one other scanning polarized RF reference source using triangulation techniques or direct distance measurements.

9. The method of claim 8, wherein the determined position of the deployed at least one other scanning polarized RF reference source is used by sensors onboard an object to determine its full position and angular orientation relative to the established reference coordinate system.

10. The method of claim 1, wherein the at least one other scanning polarized RF reference source comprises a plurality of scanning polarized RF reference sources with overlapping ranges.

11. The method of claim 10, wherein each of the plurality of scanning polarized RF reference sources are provided with information as to their orientation and/or position relative to the reference coordinate system.

12. The method of claim 11, wherein each of the plurality of scanning polarized RF reference sources are provided with information as to their orientation and/or position relative to each other.

* * * * *